US012640022B2

(12) United States Patent
Li et al.

(10) Patent No.: US 12,640,022 B2
(45) Date of Patent: May 26, 2026

(54) METHOD FOR VEHICLE-THEFT DRIVER'S IDENTIFICATION WITH PRIVACY PROTECTION

(71) Applicant: Hangzhou Normal University, Hangzhou (CN)

(72) Inventors: Xiumei Li, Hangzhou (CN); Shucheng Ying, Hangzhou (CN); Qingyun Xie, Hangzhou (CN); Qi Xie, Hangzhou (CN)

(73) Assignee: Hangzhou Normal University, Hangzhou (CN)

( * ) Notice: Subject to any disclaimer, the term of this patent is extended or adjusted under 35 U.S.C. 154(b) by 0 days.

(21) Appl. No.: 18/796,339

(22) Filed: Aug. 7, 2024

(65) Prior Publication Data

US 2026/0011228 A1     Jan. 8, 2026

(51) Int. Cl.
*G06V 20/59*          (2022.01)
*G06Q 50/26*          (2012.01)
           (Continued)

(52) U.S. Cl.
CPC ..... *G08B 13/19647* (2013.01); *G06Q 50/265* (2013.01); *G06V 10/82* (2022.01);
           (Continued)

(58) Field of Classification Search
CPC .... G06V 20/597; G06V 10/82; G06V 40/165; G06V 20/59; G06V 20/56; G06V 40/103; G06V 40/172; G06V 40/18; G06V 40/20; G06V 10/764; G06V 20/582; G06V 40/161; G06V 40/168; G06V 40/171; G06V 40/53; G06V 40/166; G06V 20/52; G06V 10/454; G06V 40/193; G06V 10/993; G06V 40/167; G06V 40/169; G06V 40/173; G06V 40/50; G06V 10/25; G06V 10/26;
(Continued)

(56) References Cited

U.S. PATENT DOCUMENTS 12,505,190 B2 * 12/2025 Maizels .................. G06F 21/32
2019/0310628 A1 * 10/2019 Taveira ............. B64D 45/0031
(Continued)

*Primary Examiner* — Dionne Pendleton
(74) *Attorney, Agent, or Firm* — Hemisphere Law, PLLC

(57) ABSTRACT

This invention pertains to the field of vehicle anti-theft technology and discloses a vehicle anti-theft method based on encrypted facial recognition. The method includes: periodically capturing facial data of the driver within the vehicle, using an in-vehicle neural network-based facial feature extraction model to extract feature vectors, and comparing these vectors with a preset whitelist to confirm authorization. If the driver is an unauthorized person, the feature vector is transmitted to the internet of vehicles for detection, where abnormal recognition triggers an alarm and uploads the data to a trusted authority within the internet of vehicles for tracking. The internet of vehicles consists of a trusted authority, auxiliary servers, cloud servers, roadside units, and vehicles, all of which deploy physically unclonable functions. This system enables rapid identity verification and anomaly detection to ensure driving safety. It can resist side-channel attacks on physical devices, capture attacks, and collusion attacks on servers, thereby protecting equipment safety and data privacy.

8 Claims, 2 Drawing Sheets

(51) Int. Cl.
 *G06V 10/82* (2022.01)
 *G06V 40/16* (2022.01)
 *G08B 13/196* (2006.01)

(52) U.S. Cl.
 CPC ............ *G06V 20/59* (2022.01); *G06V 40/168* (2022.01); *G06V 40/172* (2022.01)

(58) Field of Classification Search
 CPC .. G06V 10/462; G06V 10/761; G06V 10/771; G06V 10/772; G06V 10/774; G06V 10/95; G06V 20/41; G06V 20/58; G06V 2201/02; G06V 40/10; G06V 40/174; G06V 40/179; G06V 40/40; B60K 28/06; B60K 2360/178; B60K 2360/21; B60K 2360/741; B60K 28/066; B60K 35/10; B60K 35/22; B60K 35/26; B60K 35/28; B60K 28/02; B60W 2420/403; B60W 2540/223; B60W 2540/225; B60W 2040/0827; B60W 2756/10; B60W 2040/0818; B60W 2040/0836; B60W 2040/0845; B60W 2040/0854; B60W 2540/18; B60W 2540/215; B60W 2540/24; B60W 40/08; B60W 50/12; B60W 50/14; B60W 2554/00; B60W 30/0956; B60W 10/184; B60W 10/20; B60W 2050/009; B60W 2050/0094; B60W 2540/043; B60W 2540/22; B60W 2540/221; B60W 2540/30; B60W 2556/10; B60W 30/085; B60W 30/09; B60W 40/09; B60R 1/04; B60R 25/25; B60R 1/27; B60R 2300/105; B60R 2300/307; B60R 2300/60; B60R 2300/802; B60R 25/252; B60R 25/255; B60R 25/257; B60R 25/305; G06F 18/214; G06F 3/013; G06F 21/6245; G06F 18/2148; G06F 18/24323; G06F 16/51; G06F 16/583; G06F 16/739; G06F 16/784; G06F 18/24143; G06F 18/2415; G06F 18/25; G06F 18/251; G06F 18/256; G06F 3/005; G08G 1/096791; G08G 1/163; G08G 1/0112; G08G 1/0133; G08G 1/0141; G08G 1/04; G08G 1/09623; G08G 1/166; G08G 5/21; G08G 5/26; G08G 5/55; G08G 5/57; G08G 5/58; G08G 5/74; G08G 5/76; G08G 5/80; G08G 1/16; G08G 1/00; G08G 1/0175; B60Y 2302/05; B60Y 2302/03; B60Y 2400/90; G06N 3/04; G06N 3/045; G06N 3/08; G06N 3/0464; G06N 3/09; G06Q 50/40; G07C 5/02; G07C 5/08; G07C 5/00; H04W 4/029; H04W 4/44; Y02T 50/50; G05D 1/0055; G05D 1/027; G05D 1/0274; G05D 1/0061; G05D 1/0088; G05D 13/02; B64U 10/14; B64U 20/80; B64U 2101/30; B64U 2201/10; B64D 45/0015; B64D 45/0031; B64D 45/0059; G05B 19/042; G05B 2219/2637; G06T 2207/30201; G06T 2207/20081; G06T 2207/30232; G06T 2210/12; G06T 7/246; G06T 7/248; G06T 7/74; G06T 11/00; G06T 17/00; G06T 2207/20201; G06T 2207/30268; G06T 5/73; G06T 7/579; B60Q 5/006; B60Q 1/0023; B60Q 9/005; G08B 13/19697; G08B 13/19656; G08B 13/1966; G08B 21/06; G08B 21/18; H04K 3/825; H04N 23/64; H04N 23/90; H04N 5/77; H04N 7/181; H04N 7/188; B60T 7/12; B62D 6/001; H01J 49/0086; H01J 49/403; G11B 27/031; G11B 27/3081

See application file for complete search history.

(56) References Cited

U.S. PATENT DOCUMENTS

| | | | | |
|---|---|---|---|---|
| 2020/0372792 A1* | 11/2020 | Li | .......................... | G06V 10/764 |
| 2024/0346833 A1* | 10/2024 | Gupta | .................. | G06V 20/597 |
| 2024/0355139 A1* | 10/2024 | Kim | ....................... | G06V 20/56 |
| 2025/0061179 A1* | 2/2025 | Lennartz | .............. | G06V 10/764 |

\* cited by examiner

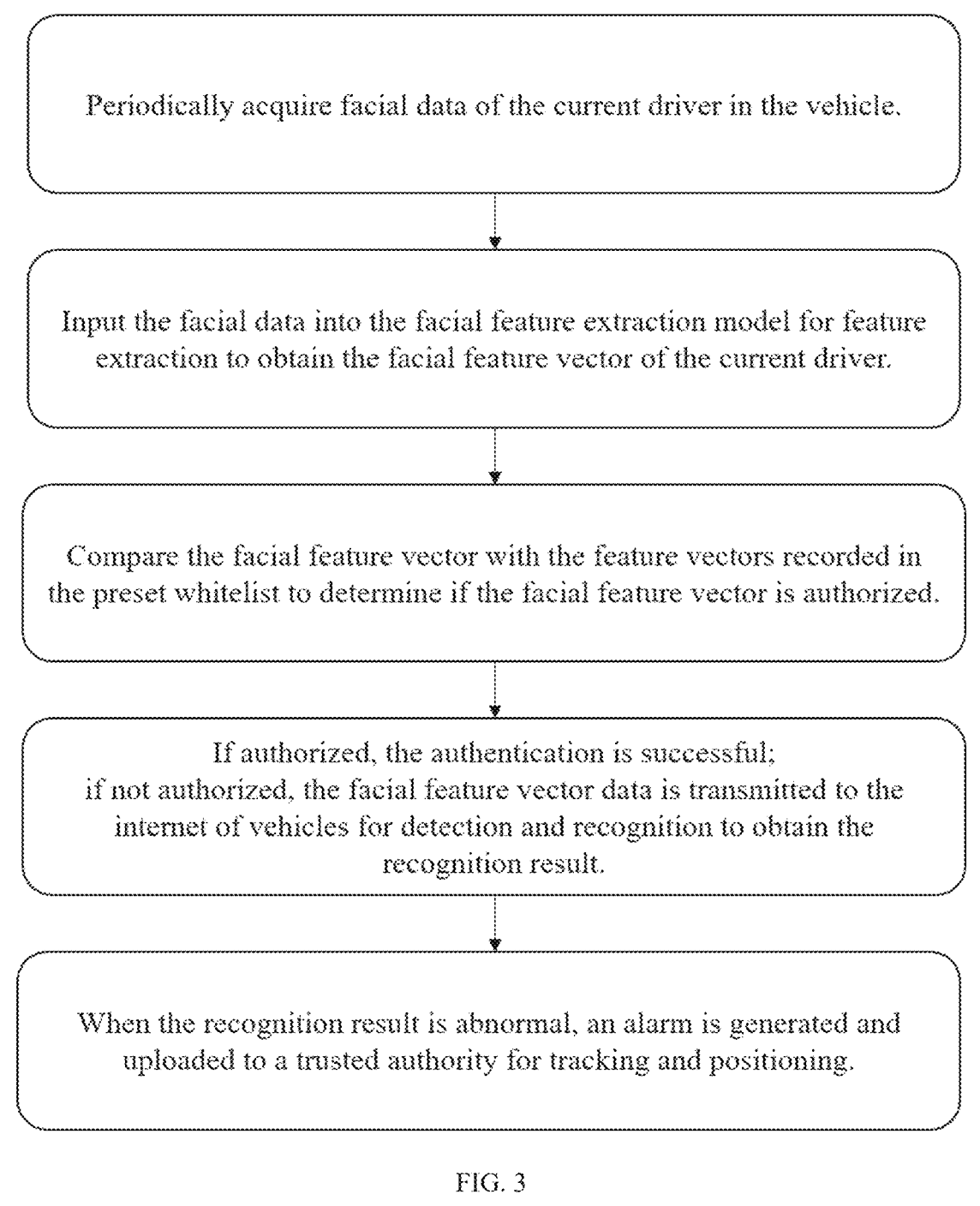

Periodically acquire facial data of the current driver in the vehicle.

Input the facial data into the facial feature extraction model for feature extraction to obtain the facial feature vector of the current driver.

Compare the facial feature vector with the feature vectors recorded in the preset whitelist to determine if the facial feature vector is authorized.

If authorized, the authentication is successful;
if not authorized, the facial feature vector data is transmitted to the internet of vehicles for detection and recognition to obtain the recognition result.

When the recognition result is abnormal, an alarm is generated and uploaded to a trusted authority for tracking and positioning.

FIG. 3

METHOD FOR VEHICLE-THEFT DRIVER'S IDENTIFICATION WITH PRIVACY PROTECTION

FIELD OF TECHNOLOGY

This invention belongs to the field of vehicle anti-theft technology, specifically involving a method based on encrypted facial recognition.

BACKGROUND TECHNOLOGY

In modern society, automobiles have become indispensable means of transportation in people's daily lives. However, frequent vehicle theft incidents not only cause financial losses to vehicle owners but also seriously impact public safety. According to statistics, millions of vehicles are stolen globally each year, posing significant threats to people's property security and social stability. Therefore, the development of an efficient and secure vehicle theft recognition solution is urgently needed.

Current vehicle anti-theft systems mainly rely on mechanical locks and electronic anti-theft devices. However, these methods have many drawbacks: mechanical locks are susceptible to violent break-ins, and electronic anti-theft devices may be vulnerable to signal interference or hacking. Thus, traditional anti-theft measures can hardly provide adequate security assurance.

CONTENT OF INVENTION

The purpose of the proposed invention is to provide a vehicle anti-theft method based on encrypted facial recognition to address the existing technological issues.

To achieve the aforementioned objectives, the proposed invention provides a vehicle anti-theft method based on encrypted facial recognition. The method includes:

Periodically obtaining facial data of the current driver in the vehicle.

Inputting the facial data into a facial feature extraction model for feature extraction, resulting in the facial feature vector corresponding to the current driver. The facial feature extraction model is integrated into the vehicle's control system and is constructed based on neural networks.

Comparing the extracted facial feature vector with feature vectors recorded in a predefined whitelist to determine if the facial feature vector is authorized. If authorized, authentication is granted. If unauthorized, transmitting the facial feature vector data to the internet of vehicles for recognition, obtaining recognition results. Generating alarm information and uploading it to the trusted authority of the internet of vehicles for tracking and location processing when the recognition result is abnormal.

The internet of vehicles includes a trusted authority and auxiliary servers, cloud servers, roadside units, and vehicles registered within this trusted authority. The trusted authority is a legitimate system responsible for managing and controlling national citizen identity information. Physical unclonable functions are deployed in both the auxiliary servers, cloud servers, roadside units, and vehicles.

Optionally, the method compares the detected facial feature vector with the feature vectors recorded in a predefined whitelist, specifically:

Calculating the Euclidean distance between the detected facial feature vector and the feature vectors recorded in the whitelist based on the Euclidean distance formula. Based on the computed Euclidean distance value, determining whether the detected facial feature vector is authorized information.

Optionally, the process of registering the auxiliary server with the trusted authority specifically includes:

The auxiliary server sends a registration request to the trusted authority. Upon receiving the request, the trusted authority generates corresponding homomorphic encryption key pairs and standard encryption key pairs for the auxiliary server. These keys are then sent to the auxiliary server. The auxiliary server computes the response values for the homomorphic encryption key pairs and the standard encryption keys using a physical unclonable function. Based on these response values, the auxiliary server calculates protection parameters for its keys and stores and backs up these calculated parameters, completing the registration process.

Optionally, the process of registering the cloud server with the trusted authority specifically includes:

The cloud server sends a registration request to the trusted authority. Upon receiving the request, the trusted authority generates standard encryption key pairs for the cloud server and sends them to the cloud server. The cloud server protects and stores these standard encryption key pairs using a physical unclonable function.

Subsequently, the cloud server selects citizen identity information based on the designated region and encrypts this information using the homomorphic encryption key pairs corresponding to the auxiliary server. The encrypted citizen identity information is then transferred to the cloud server for storage and backup, completing the registration process.

Optionally, the process of registering the roadside unit with the trusted authority specifically includes:

The roadside unit sends a registration request to the trusted authority. Upon receiving the registration request, the trusted authority generates registration data for the roadside unit, which includes unique identity data and the roadside unit's private key. This data is securely transmitted to the roadside unit through a secure channel.

Upon receiving the registration data, the roadside unit performs availability verification. Once verified, the roadside unit protects and stores the registration data and secret parameters using a physical unclonable function, thereby completing the registration process.

Optionally, the process of registering the vehicle with the trusted authority specifically includes:

The vehicle sends its chassis number data to the trusted authority for registration. Upon receiving this data, the trusted authority generates registration parameters. The vehicle validates these registration parameters. Upon successful validation, the vehicle generates encryption keys and constructs a whitelist based on citizen identity information. Subsequently, the vehicle stores and backs up the generated encryption keys and whitelist, thereby completing the registration process.

Optionally, transmitting the detected facial feature vector data to the internet of vehicles for detection and recognition specifically includes:

Implementing mutual authentication and key negotiation between the vehicle and the roadside unit to obtain a session key. Encrypting the detected facial feature vector data using the homomorphic encryption key pair corresponding to the auxiliary server. Encrypting the homomorphic ciphertext data of the facial feature vector based on the session key. Transmitting the encrypted homomorphic ciphertext data to the cloud server. The cloud server computes and compares the encrypted homomorphic ciphertext data using homomorphic encryption technology and garbled circuit techniques to obtain the recognition result.

The technical effects of the proposed invention are as follows:

The invention continuously monitors the driver's face in driving vehicles to determine if the vehicle is stolen, triggering identity recognition algorithms once a potential theft is detected.

The invention employs mutual authentication to verify the identities of vehicles and Road Side Units (RSUs) and negotiate session keys. Through mutual authentication, common attacks such as man-in-the-middle and replay attacks are effectively prevented, while session key establishment ensures secure communication between vehicles and RSUs.

The On-Board Unit (OBU) in vehicles, Road Side Unit (RSU), cloud server, and auxiliary server in this invention deploy Physical Unclonable Function (PUF), which withstands physical device side-channel attacks, capture attacks, and collusion attacks on servers, ensuring device security and data privacy.

By utilizing collaborative efforts between cloud servers and auxiliary servers, this invention employs homomorphic encryption and garbled circuit techniques to effectively safeguard the privacy and security of driver facial data and facial databases.

FIGURE LEGENDS

To clearly illustrate the embodiments of the proposed invention or the technical solutions in the prior art, brief descriptions of the accompanying drawings used in the embodiments are provided below. It is evident that the figures described below are merely some embodiments of the proposed invention, and those skilled in the art can derive other figures based on these figures without exercising inventive effort.

The accompanying figures, which form part of this application, are provided to further understand the present application. Exemplary embodiments and their descriptions are used to explain the present application and do not constitute inappropriate limitations of the present application. In the figures.

FIG. 3 presents the implementation flowchart in embodiments of the proposed invention.

SPECIFIC IMPLEMENTATION

Detailed descriptions of various exemplary embodiments of the proposed invention are provided below. This detailed description should not be construed as limiting the invention but rather as providing a more detailed explanation of certain aspects, features, and implementation schemes of the invention.

The terms used in the proposed invention are intended specifically to describe particular embodiments and should not be construed as limiting the invention. Additionally, numerical ranges disclosed herein should be understood to specifically disclose every intermediate value between the upper and lower limits of the range. Any smaller ranges within stated values or within intermediate values between such ranges are also encompassed within the invention. The upper and lower limits of these smaller ranges may independently be included or excluded from the range.

Unless otherwise stated, all technical and scientific terms used herein have the same meaning as understood by those skilled in the art of the invention. While the invention has been described with reference to preferred methods, any similar or equivalent methods may be used in the implementation or testing of the invention as described herein. All references mentioned in this specification are incorporated by reference to disclose and describe methods related to the referenced literature. In case of conflict with any incorporated literature, the content of this specification shall prevail.

Numerous modifications and variations of specific embodiments of the proposed invention described in this specification are possible without departing from the scope or spirit of the invention, as would be apparent to those skilled in the art. Other embodiments derived from the disclosure of this invention would be apparent to those skilled in the art. This application specification and its embodiments are exemplary only.

Regarding terms such as "comprising," "including," "having," "containing," etc., used herein, these are openended terms meaning "including but not limited to."

It should be noted that, unless conflicting, features of embodiments in the present application may be combined with each other. The following detailed description will refer to the accompanying drawings and combine with the embodiments to illustrate the present application.

Embodiment 1

Figure 1:
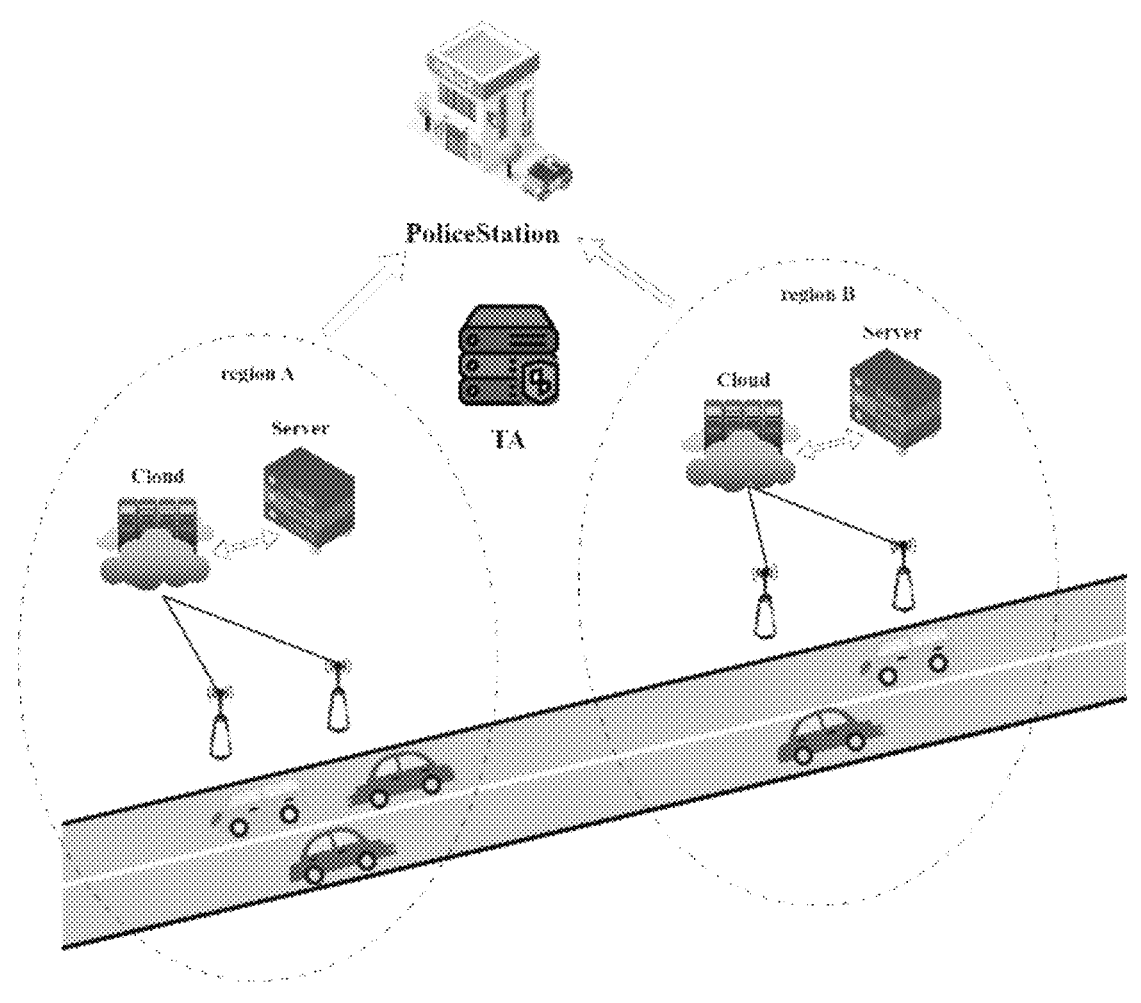
FIG. 1 depicts the framework structure of the vehicle network system in embodiments of the proposed invention.
Figure 2:
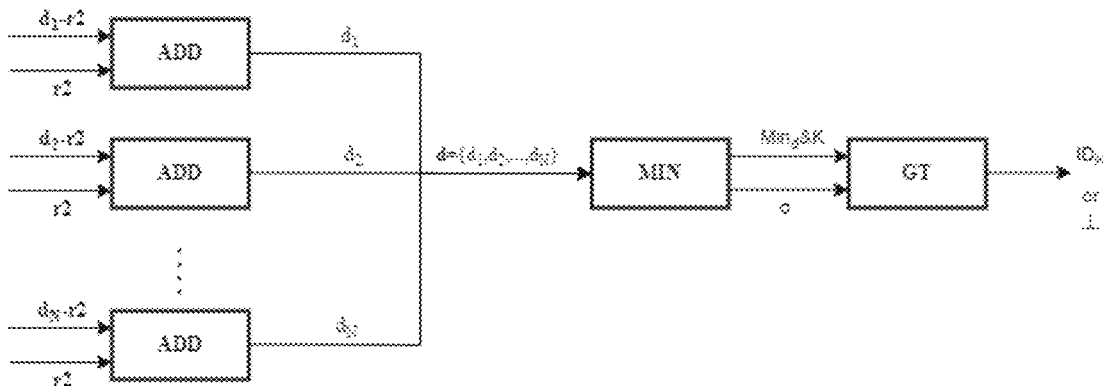
FIG. 2 shows the logic circuit diagram in embodiments of the proposed invention.

As shown in FIGS. 1 to 3, this embodiment provides a vehicle anti-theft method based on encrypted facial recognition. The method includes:

Periodically obtaining facial data of the current driver in the vehicle;

Inputting the facial data into a facial feature extraction model for feature extraction to obtain the detected facial feature vector of the current driver. The facial feature extraction model is integrated into the vehicle's control system and is constructed based on neural networks.

Comparing the detected facial feature vector with feature vectors recorded in a preset whitelist to determine if the detected facial feature vector is authorized. If authorized, authentication is granted; if unauthorized, transmitting the detected facial feature vector data to the internet of vehicles for detection and recognition. Upon detecting an abnormal recognition result, generating alarm information and uploading it to the trusted authority center within the internet of vehicles for tracking and localization processing.

The internet of vehicles includes a trusted authority center and auxiliary servers, cloud servers, roadside units, and vehicles registered within the trusted authority center. The trusted authority center operates as a legally authorized system managing national citizen identity information. Physical Unclonable Functions (PUFs) are deployed in the auxiliary servers, cloud servers, roadside units, and vehicles to enhance device security and protect data privacy.

This embodiment continuously detects the driver's face while the vehicle is moving to determine if the vehicle is stolen. Upon suspicion of theft, it activates an algorithm to identify the driver's identity.

Mutual authentication is employed to verify the identity between vehicles and Roadside Units (RSUs) and negotiate session keys. Mutual authentication effectively prevents common attacks such as man-in-the-middle and replay attacks, while the establishment of session keys ensures secure communication between vehicles and RSUs.

In this embodiment, On-Board Units (OBUs) in vehicles, RSUs at roadside locations, cloud servers, and auxiliary servers deploy Physical Unclonable Functions (PUFs) to resist physical device side-channel attacks, capture attacks, and collusion attacks on servers, thereby safeguarding device security and data privacy.

After mutual authentication and establishment of a secure session key between the suspected stolen vehicle and RSU, the driver's face information and vehicle identity are encrypted using the session key and sent to the RSU. The RSU decrypts this information, encrypts the suspected driver's facial information using the homomorphic public key of the auxiliary validation server, then encrypts the homomorphic ciphertext of the suspected driver's facial information and vehicle information with its own private key before sending it to the cloud server. Upon verifying that the information originates from the RSU, the cloud server collaborates with the auxiliary server to identify the suspected driver's identity. If the local thief's identity is confirmed, the information is sent to the police for further action. If the thief is not local, their information is forwarded to the police station to search for the thief in the national facial database.

This embodiment presents a theft identification scheme based on homomorphic encryption, garbled circuits, mutual authentication, and key negotiation, ensuring high security and privacy protection capabilities. OBUs in vehicles, RSUs at roadside locations, cloud servers, and auxiliary servers deploy Physical Unclonable Functions (PUFs) to resist physical device side-channel attacks, capture attacks, and collusion attacks on servers.

Specific steps include:

Step 1: System initialization;

Step 2: Registration stage;

Step 3: Driver identification stage;

Step 4: Vehicle and RSU authentication and message transmission;

Step 5: Vehicle thief identification stage;

Step 1 and 2 of the registration process involve a series of initialization and registration operations that enable the system to acquire the necessary parameters, keys, and authentication identification information required for task execution. This includes trusted authority such as the police department (PS) selecting and generating necessary elliptic curve parameters, base points, private keys, and public keys, which are then distributed to relevant devices and servers. Additionally, the system deploys symmetric encryption algorithms, secure one-way hash functions, and establishes and maintains a national database of citizen facial feature vectors, ensuring that each registration node, including vehicles, RSUs, and cloud servers, can correctly receive, store, and use these critical security parameters and authentication information, thereby providing a solid foundation for subsequent legal driver identification, vehicle and RSU authentication and message transmission, and vehicle-theft driver identification.

In step 4, the vehicle and RSU authentication and message transmission phase, a series of security protocols and encryption operations ensure secure communication between the vehicle and the roadside unit (RSU). In this stage, the vehicle first generates a random number and a challenge value, and uses a physical unclonable function (PUF) and a hash function to calculate relevant response values and keys. The vehicle and RSU perform mutual authentication to verify each other's identity and exchange necessary encrypted parameters and messages. After receiving information from the vehicle, the RSU will also perform corresponding calculations and verification to ensure the integrity and authenticity of the message. This stage not only ensures the security of the vehicle against side-channel attacks and the RSU against capture attacks, the integrity and confidentiality of data during transmission, but also provides a reliable foundation for subsequent data exchange and collaboration.

In step 5, during the vehicle-theft driver identification stage, precise facial ciphertext recognition of facial feature vectors is achieved by combining anti-server capture attack and anti-conspiracy attack homomorphic encryption and garbled circuit technology. In this phase, the vehicle encrypts the collected driver's facial feature vector and transmits it to the cloud server. The cloud server utilizes fully homomorphic encryption to perform calculations on the ciphertext, ensuring that data remains encrypted throughout processing. Through homomorphic operations, the cloud server can conduct preliminary face matching without decryption, such as calculating Euclidean distances. Subsequently, further secure computations on the facial feature vector are performed using garbled circuit technology to prevent any leakage of sensitive information throughout the entire process. Ultimately, based on the recognition result and in conjunction with location information provided by RSU, the system determines identity details of potential vehicle thieves and enables real-time tracking and positioning of these individuals.

In the system registration phase, auxiliary servers, cloud servers, RSUs, and vehicles undergo registration processes.

During auxiliary server registration, homomorphic encryption key pairs and standard encryption key pairs are initially generated. The homomorphic encryption key pair is used for encrypting facial feature vectors to ensure data privacy and security during processing, with the private key protected using physical unclonable functions (PUF) to guarantee its security and uniqueness.

Similarly, cloud server registration involves generating standard encryption key pairs protected by PUF, along with creating an encrypted facial feature vector database. This database consists of facial feature vectors of selected representative individuals from the region, encrypted using the auxiliary server's homomorphic public key for subsequent facial recognition processes.

RSU and vehicle registrations include generating standard encryption key pairs also protected by PUF, ensuring the security and non-replicability of keys. Identity verification during registration utilizes Schnorr signatures, confirming the legitimacy of devices through signature generation and verification processes with authorities like the police station.

Following the registration phase, vehicles and RSUs undergo mutual authentication and message transmission when a driver's facial features do not match the preset whitelist during detection. This process involves initiating mutual authentication protocols between vehicles and RSUs to ensure mutual authenticity through secure interactions, including random number exchanges and response value calculations. The resulting symmetric key from this authentication ensures subsequent encrypted message transmissions between vehicles and RSUs, maintaining data confidentiality and integrity.

During the thief identification phase, homomorphic encryption and garbled circuit techniques are employed to perform accurate facial recognition without compromising the privacy of facial feature vectors. Scanned facial feature data is encrypted and transmitted to cloud servers for processing, where homomorphic encryption allows computations and comparisons on encrypted facial feature vectors without decryption. This method ensures privacy and security during data transmission and processing, including calculating Euclidean distances between feature vectors to match scanned faces with registered ones in the database. Garbled circuit technology further enhances security by processing and filtering comparison results, generating alerts and reporting anomalies to the police station if scanned facial features do not match any registered legitimate driver features. The police station can then use the provided information for further investigation and tracking to address potential vehicle theft activities promptly.

The specific implementation process of this embodiment includes:

Step 1: Generate Necessary Parameters

The police station (PS), as a trusted authority, first selects an elliptic curve $E(GF_q)$ with base point P, and then chooses its private key $sk_s \in$ $$Z_q^*,$$

computing the public key $PK_s = sk_s \cdot P$. Next, a secure symmetric encryption/decryption algorithm $E_{sk}(\cdot)/D_{sk}(\cdot)$ and a secure one-way hash function $h(\cdot)$ are selected.

Deploy National Facial Database: The police station (PS) deploys a national database of citizen faces $$< \vec{v_1}, ID_i, DID_i >_{i=1}^{AN},$$

where $\vec{v_i}$ represents facial feature vectors $ID_i$ denotes unique vehicle chassis numbers (default as $\perp$), $DID_i$ stands for citizen identity card numbers, and AN denotes the number of pairs of feature vectors in the database.

Through these steps, the police station ensures the foundational security and data integrity of the system, laying a solid groundwork for subsequent vehicle-theft driver's identification and authentication. The encryption and hashing technologies employed during initialization effectively prevent data leaks and tampering, ensuring that only authorized entities can access and manipulate sensitive information. The establishment of the facial database provides essential data support for rapid and accurate identity recognition.

Step 2: Registration Phase.

The registration phase involves registering various entities into the system.

Auxiliary Server Registration ($SA_I$): after system initialization, the police station (PS) registers each auxiliary server ($SA_I$) to ensure its secure and effective operation within the system. The registration process is as follows:

Select Homomorphic Encryption Keys: PS first selects the CKKS homomorphic encryption private key $\overline{sk_{SAI}}$ for auxiliary server $SA_I$. Using this private key, compute the corresponding public key $\overline{PK_{SAI}} = \overline{sk_{SAI}} \cdot P$.

Select Standard Encryption Keys: PS continues by selecting a new private key $sk_{SAI}$ for $SA_I$ and calculates the corresponding public key $PK_{SAI} = sk_{SAI} \cdot P$.

Transmit Key Information: Transmit the key information $\{\overline{sk_{SAI}}, \overline{pk_{SAI}}, sk_{SAI}, PK_{SAI}\}$ via a secure channel to auxiliary server $SA_I$. This step ensures the confidentiality and integrity of data during transmission, preventing theft or tampering of key information.

Generate Challenge and Response Values: Upon receiving the public-private key pair from PS, $SA_I$ selects a random challenge value $C_{SAI}$ and computes its response value $R_{SAI} = PUF_1(C_{SAI})$ using a physically unclonable function.

Protect Keys with PUF: $SA_I$ then computes $ssk_{SAI} = sk_{SAI} \oplus h(R_{SAI})$ and $\overline{ssk_{SAI}} = \overline{sk_{SAI}} \oplus h(R_{SAI}||1)$ to protect $sk_{SAI}$ and $\overline{sk_{SAI}}$, respectively, using a hash function $h(\cdot)$ to enhance key security.

Store Key Information: $SA_I$ stores the computed information, including $\{PK_{SAI}, ssk_{SAI}, C_{SAI}, PUF_1, \overline{ssk_{SAI}}, \overline{PK_{SAI}}\}$, ensuring quick access for encryption and decryption operations when needed.

PS Saves Key Backup: Simultaneously, PS retains a backup of the key information $\{\overline{sk_{SAI}}, \overline{PK_{SAI}}, sk_{SAI}, PK_{SAI}\}$ for verification and data recovery purposes.

Through these steps, auxiliary server $SA_I$ securely registers into the system, equipped with the necessary key information to perform its tasks. This registration process utilizes key generation and PUF technology to ensure key security, preventing unauthorized access and operations. Additionally, the challenge-response mechanism using PUF enhances data integrity and confidentiality during transmission and storage.

Cloud Server Registration ($CS_I$): After system initialization and auxiliary server registration, the police station (PS) proceeds to register each cloud server ($CS_I$) to ensure its secure and efficient operation within the system. The registration process is as follows:

Select Identity and Keys: PS first selects the identity identifier $CID_I$ and private key $sk_{CSI}$ for cloud server $CS_I$, calculating the corresponding public key $PK_{CSI} = sk_{CSI} \cdot P$.

Transmit Key Information: Transmit the key pair $\{sk_{CSI}, PK_{CSI}\}$ via a secure channel to cloud server $CS_I$. This step ensures the confidentiality and integrity of data during transmission, preventing theft or tampering of key information.

Generate Challenge and Response Values: Upon receiving the public-private key pair from PS, $CS_I$ selects a random challenge value $C_{CSI}$ and computes its response value $R_{CSI} = PUF_2(C_{CSI})$ using a physically unclonable function (PUF).

Protect Keys with PUF: $CS_I$ then computes $ssk_{CSI} = sk_{CSI} \oplus h(R_{CSI})$, using a hash function $h(\cdot)$ to enhance key security.

Select Driver Face Sample Library: PS selects the driver face Sample library $$< \vec{v_1}, ID_i >_{i=1}^{N}$$

for the current region, where $\vec{v_i}$ represents facial feature vectors extracted by models (e.g., FaceNet) for driver $ID_i$. N denotes the number of drivers in the current region.

Encrypt Face Samples: PS encrypts the face sample library using the auxiliary server $SA_I$'s homomorphic encryption public key $\overline{PK_{SAI}}$, obtaining homomorphic ciphertexts for cloud server $$< Cv_i, C_{ID_i} >_{i=1}^{N} = Enc_{\overline{PK_{SAL}}}(\vec{v_1}, ID_i).$$

Transmit Encrypted Samples: PS transmits the encrypted homomorphic ciphertexts to cloud server $CS_l$, ensuring the security and privacy protection of sample data during transmission.

Store Key and Sample Information: $CS_l$ stores the received information, including cloud server $\{CID_l, PK_{CSl}, ssk_{CSl}, C_{CSl}, PUF_2,$ $$< C_{v_i}, C_{ID_i} >_{i=1}^{N}\},$$

for subsequent processing and verification.

PS Saves Key Backup: PS also maintains a backup of the cloud server's key information, specifically cloud server $\{sk_{CSl}, PK_{CSl}\}$, for verification and data recovery purposes.

Through these steps, cloud server $CS_l$ completes registration, equipped with the necessary keys and encrypted data to perform its responsibilities. This registration process ensures the security and confidentiality of data during transmission and storage, providing a foundation for secure communication within the network. The challenge-response mechanism using PUF enhances key security, and PS's periodic review and update measures further ensure the system's reliability and persistence.

RSU Registration: To ensure the effective operation of roadside units ($RSU_j$) within the system, the police station (PS) registers them. This process ensures $RSU_j$'s identity verification and secure communication. The registration steps are as follows:

Select Identity and Secret Parameters: First, PS selects the identity identifier $SID_j$ and secret parameter $sk_{RSj}$ for each $RSU_j$, calculating the corresponding public key $PK_{RSj}=sk_{RSj}\cdot P$.

Transmit Identity and Secret Parameters: PS sends the message containing RSU $\{SID_j, sk_{RSj}\}$ through a secure channel to $RSU_j$, ensuring data integrity and confidentiality during transmission to prevent interception and tampering risks.

Select Challenge and Compute Response Values: Upon receiving the information from PS, $RSU_j$ generates a random challenge value $C_{RSj}$ and computes the response value $R_{RSj}=PUF_j(C_{RSj})$ using a physically unclonable function (PUF).

Protect Keys with PUF: $RSU_j$ computes $ssk_{RSj}=sk_{RSj}\oplus h(R_{RSj})$ using the received secret parameter and computed response value, enhancing key security with a hash function $h(\cdot)$.

Store Registration Information: Finally, $RSU_j$ stores all pertinent information, including $\{SID_j, PK_{RSj}, C_{RSj}, PUF_j, ssk_{RSj}\}$, for subsequent identity verification and secure communication.

Through these steps, $RSU_j$ securely registers into the system, equipped with the necessary keys and authentication information to fulfill its tasks. This registration process not only ensures the security of data transmission and storage but also provides a foundation for secure communication within the network. The challenge-response mechanism using PUF effectively prevents various attacks, ensuring key confidentiality in diverse scenarios. This method allows PS to maintain a highly secure operating environment, enabling $RSU_j$ to reliably execute its designated tasks within the network.

Vehicle Registration: To ensure the legitimate identity and secure operation of vehicle $V_i$ within the system, the police station (PS) registers it. This process ensures the verification of vehicle identity and secure communication. The specific steps are as follows:

Send Unique Chassis Number: Vehicle $V_i$ first sends its unique chassis number $ID_i$ to the police station (PS).

Generate Registration Parameters: Upon receiving chassis number $ID_i$, PS selects a random number $a_i$ and calculates $A_i=a_i\cdot P$. Then, PS calculates $b_i=a_i+sk_s\cdot h(A_i\|ID_i\|PK_s)$ and returns $\{b_i, A_i\}$ to vehicle $V_i$.

Verify Registration Information: Upon receiving $\{b_i, A_i\}$, vehicle $V_i$ verifies. The vehicle computes $b_iP=A_i+h(A_i\|ID_i\|PK_s)PK_s$. If the calculation results are consistent, the verification passes; otherwise, the vehicle requests PS to resend registration information.

Protect Keys with PUF: After successful verification, vehicle $V_i$ selects a challenge value $C_{vi}$ and computes response value $R_{vi}=PUFV_i(C_{vi})$. Then, the vehicle calculates $bb_i=b_i\oplus h(R_{vi})$.

Extract Driver Facial Features and Establish Whitelist: The driver uses models deployed on the vehicle unit to extract facial feature vectors for potential drivers such as family members. Each feature vector pairs with the corresponding identity information, forming $$< \vec{v_i}, ID_i >_{i=1}^{L},$$

where L denotes the number of legitimate drivers for the vehicle (typically less than 10). This data is stored in the vehicle's secure storage.

Store Registration Information: Finally, vehicle $V_i$ stores essential registration information, including vehicle $\{PUFV_i, C_{vi}, bb_i, A_i,$ $$\langle \vec{v_i}, ID_i \rangle_{i=1}^{L}\}.$$

This information is used for subsequent identity verification and secure communication.

Through these steps, vehicle $V_i$ completes registration, equipped with the necessary keys and authentication information to perform its tasks. This registration process ensures the security of data transmission and storage, providing a foundation for secure vehicle operation within the network. Meanwhile, the facial features of the driver and relatives are stored in the whitelist, ensuring that only authorized drivers can start and drive the vehicle. This process provides reliable security for vehicle operations within the network.

Step 3: Driver Identification Phase

Once the vehicle enters normal driving mode, the onboard facial recognition system is activated to identify the driver. This phase involves scanning the driver's face using the onboard camera and extracting facial feature vectors using a neural network. The onboard camera regularly scans the driver's face, capturing facial images, which are then processed by a neural network to extract facial feature vectors $\vec{x_l}$. These feature vectors encode various dimensions of facial features.

Calculating Euclidean distance to Whitelist Each extracted facial feature vector $\vec{x_l}$ is compared against stored facial feature vectors of legitimate drivers in the whitelist. For each person in the whitelist, compute the Euclidean distance:

$$d_j = \sum_{k=1}^{n}(x_{ik} - v_{jk})^2 \ (j = 1,2 \ \dots \ L)$$

where n is the dimensionality of the feature vector, and L is the number of legitimate drivers in the whitelist. If there exists a $d_j < \sigma$, where $\sigma$ is a predefined threshold, the current driver is recognized as legitimate, and authentication is successful, halting further actions. Otherwise, authentication fails, and the system proceeds to the next step.

The key to this phase lies in the extraction of facial feature vectors and their comparison with those stored in the whitelist. Using a neural network for facial feature extraction is an efficient and accurate method. The network converts facial images into vectors, with each element representing the strength of a feature or a specific facial characteristic. This vector representation captures crucial facial features, facilitating subsequent comparisons and identifications.

The Euclidean distance serves as a common metric for assessing similarity between two vectors. In this context, each extracted feature vector $\vec{x_l}$ is compared against every legitimate driver's feature vector $\vec{v_j}$ stored in the whitelist. The distance quantifies the dissimilarity between the vectors, where smaller distances indicate greater similarity.

By setting a threshold $\sigma$, the system determines whether the distance between the current driver's feature vector and any legitimate driver's vector falls within an acceptable range. If so, the driver is authenticated as legitimate, ensuring operational continuity. Otherwise, the system rejects authentication, prompting further security measures or driver checks.

The effectiveness of this phase relies on robust facial recognition technology and precise distance metrics, ensuring accurate identification of legitimate drivers. The calculation of Euclidean distances and the setting of thresholds directly influence the accuracy of identification and the overall security of the system. Therefore, thorough testing and adjustments are necessary in practical applications to ensure reliable and accurate identification.

Step 4: Vehicle and RSU Authentication and Message Transmission

When the driver's face fails to pass the whitelist check, vehicle $V_i$ initiates mutual authentication and message transmission with roadside unit (RSU) cloud server $RSU_j$. Here are the detailed steps of this process:

Vehicle $V_i$ first selects two random numbers $a_1$ and $a_2$. It then computes $$R_{vi} = PUFV_i(C_{vi}),$$

$$b_i = bb_i \oplus h(R_{vi}),$$

$$A_1 = a_1P,$$

$$A_2 = a_1PK_{RSj},$$

$$B_i = b_i + a_1h(A_1\|a_2\|ID_i\|A_i\|SID_j\|T_1),$$

$$BB_i = B_iP,$$

$$A_3 = E_{A2}(ID_i, A_i, BB_i, SID_j, a_2, T_1),$$

$$A_4 = h(a_2\|ID_i\|A_i\|BB_i\|SID_j\|T_1),$$

and sends $\{A_1, A_3, A_4\}$ to $RSU_j$.

$RSU_j$ computes $A'_2 = sk_{RSj}A_1$, decrypts $A_3$ to obtain $$(ID_i, A_i, BB_i, SID_j, a_2, T_1) = D'_{A'_2}(A_3)$$

and checks the freshness of $T_1$. It then proceeds with verification. If both conditions hold:

$$BB_i = h(A_1\|a_2\|ID_i\|A_i\|SID_j\|T_1)A_1 + A_i + h(A_i\|ID_i\|PK_s)PK_s$$

$$A'_4 = h(a_2\|ID_i\|A_i\|B_i\|SID_j\|T_1) = A_4$$

authentication passes; otherwise, the process terminates. $RSU_j$ then selects a random number $a_3$ and computes:

$$A_5 = a_3P$$

$$SK_{rjvi} = h(a_2\|a_3A_1\|ID_i\|SID_j\|T_1\|T_2)$$

$$A_6 = h(SK_{rjvi}\|A_1\|a_2\|A_5\|T_1\|T_2)$$

Once computed, $RSU_j$ sends $\{A_5, A_6, T_2\}$ to $V_i$.

Upon receiving the message, $V_i$ first checks the freshness of $T_2$, then computes:

$$SK_{virj} = h(a_2\|a_1A_5\|ID_i\|SID_j\|T_1\|T_2)$$

and verifies if $A_6 = h(SK_{virj}\|A_1\|a_2\|A_5\|T_1\|T_2)$. If equal, authentication completes key agreement. Finally, $V_i$ computes $M_1 = E_{SK_{virj}}(<\vec{x_l}, ID_i>)$ and sends it to $RSU_j$ to complete message delivery.

Message Verification and Freshness Check: The cloud server verifies received messages and checks the freshness of timestamps, ensuring message integrity and timeliness.

Key Agreement and Message Transmission: After completing verification and key agreement, the cloud server and vehicle $V_i$ can use the negotiated key for encryption and decryption, ensuring the security and confidentiality of subsequent communications. Ultimately, vehicle $V_i$ sends encrypted messages to $RSU_j$ to complete message delivery.

This process ensures secure communication between vehicle $V_i$ and roadside unit $RSU_j$, providing a reliable foundation for subsequent data exchange and collaboration.

Step 5: Thief Identification Phase

When RSU receives a facial recognition request from a vehicle, to protect the privacy of facial data, RSU encrypts and transmits it to the cloud for auxiliary recognition within the area. The process is detailed as follows:

$RSU_j$ first computes:

$$R_{RSj} = PUF_j(C_{RSj})$$

$$sk_{RSj} = ssk_{RSj} \oplus h(R_{RSj})$$

$$\langle C_x, C_{IDx} \rangle = E_{\overline{PK_{SAI}}}(\langle \vec{x_l}, ID_i \rangle)$$

$$M_2 = \{E_{sk_{RSj}}(E_{PK_{CSI}}(\langle C_x, X_{IDx} \rangle, SID_j), T_3), SID_j\}$$

and sends $M_2$ to $CS_l$.

Upon receiving the message, $CS_l$ verifies if $M_2$ comes from $SID_j$ and decrypts it using its public key to obtain $\{E_{PK_{CSl}}(<C_x, C_{IDx}>, SID_j), T_3\}$. $CS_l$ then checks the freshness of $T_3$. $CS_l$ decrypts $\{<C_x, C_{IDx}>, SID_j\}$ using its private key and verifies again if the message originates from $RSU_j$ based on $SID_j$. $CS_l$ retrieves the homomorphic ciphertext samples of the scanned face $C_x$ and the unique number of the vehicle.

Next, $CS_l$ computes the Euclidean distance between the scanned face and the face sample. The detailed calculation process is as follows:

$$C_{di} = (C_{vi} - C_x)^2 (i = 1,2, \ldots, N)$$

$CS_l$ then randomly selects a vector $\vec{r_1}$ and encrypts it using $\overline{PK_{SAl}}$ calculating $$C_{r1} = Enc_{\overline{PK_{SAl}}}(\vec{r_1})$$

$$Y_i = C_{di} - C_{r1} (i = 1,2, \ldots, N)$$

$CS_l$ sends $Y_i$ (for i=1, 2, . . . , N) to $SA_l$.

Upon receiving $Y_i$, $SA_l$ first decrypts it using its private key $\overline{sk_{SAl}}$ to obtain $\vec{d_l} - \vec{r_1}$, where $\vec{d_l} = (v_{i1} - x_{i1}, v_{i2} - x_{i2}>, \ldots, v_{in} - x_{in})$. $SA_l$ then selects a random vector $\vec{r_2}$ and calculates:

$$M_3 = \vec{d_l} - \vec{r_1} - \vec{r_2}$$

and sends it back to $CS_l$. $CS_l$ computes:

$$M_4 = M_3 + \vec{r_1}$$

At this point, $CS_l$ holds $\vec{d_l} - \vec{r_2}$ and $SA_l$ holds $\vec{r_2}$. Since the subsequent Minimization operation is a non-polynomial function operation, Yao's garbled circuit is used to solve this problem. The detailed process is as follows:

First, construct a Boolean circuit for solving the Min(t) function. The Min(t) function is designed to find the minimum value and its corresponding index in a set of values within a Boolean circuit. The input is a set of values $\vec{d} = \{d_1, d_2, \ldots, d_N\}$, and the output is the minimum value $min_d$ and its index k. The algorithm initializes $min_d$ to the first value $d_1$ and sets the index k to 1. It then iterates through the list starting from the second value. For each element d[i], it uses the Boolean gate GTGate to check if the current minimum $min_d$ is greater than d[i]. If true, it updates the minimum value and its index. Finally, the algorithm returns the minimum value $min_d$ and its index k. This algorithm efficiently finds the minimum value in a Boolean circuit through pairwise comparisons. Construct the complete Boolean circuit (as shown in FIG. 2). $CS_l$ generates a truth table based on the complete Boolean circuit and randomly permutes it. Then, $CS_l$ symmetrically encrypts the output of each layer and finally scrambles to obtain the final garbled circuit table (T).

$CS_l$ then sends the circuit table (T) and confusion values to $SA_l$. $CS_l$ and $SA_l$ perform oblivious transfer (OT), where $SA_l$ obtains the confusion input values and decrypts layer by layer to obtain the final function output value ($min_d$, K) and shares it with $CS_l$.

$CS_l$ compares $min_d$ with threshold $\sigma$. If $min_d < \sigma$, it indicates a problem during whitelist authentication of vehicle $V_i$ or a suspected thief present in the current area. $CS_l$ reports the detection result to PS for decision-making. $CS_l$ calculates:

$$M_5 = \{E_{sk_{CSl}}(E_{PK_S}(\langle C_x, C_{IDx}\rangle, \langle C_{v_K}, C_{ID_K}\rangle, CID_l), T_4), CID_l\}$$

and sends $M_5$ to PS. Upon receiving $M_5$, PS verifies if the message comes from $CID_l$, decrypts it using $CID_l$'s public key to obtain $\{E_{PK_S}(<C_x, C_{IDx}>, <C_{v_K}, C_{ID_K}>, CID_l), T_4\}$, and checks the freshness of $T_4$. Then, PS decrypts it using its private key $sk_s$ to obtain $\{<C_x, C_{IDx}>, <C_{v_K}, C_{ID_K}>, CID_l\}$. PS verifies the message source again based on $CID_l$, and since during registration phase PS has $\overline{sk_{SAl}}$, it decrypts $<C_x, C_{IDx}>$, $<C_{v_K}, C_{ID_K}>$ and retrieves the scanned face and its identity $<\vec{x_l}, ID_i>$ and thief's face and identity $<\vec{v_K}, ID_K>$.

If $min_d > \sigma$, indicating the suspected thief is not in the current area, $CS_l$ calculates:

$$M_6 = \{E_{sk_{CSl}}(E_{PK_S}(\langle C_x, C_{IDx}\rangle, CID_l), T_4), CID_l\}$$

and sends $M_6$ to PS. Upon receiving $M_6$, PS verifies if the message comes from $CID_l$, decrypts it using $CID_l$'s public key to obtain $\{E_{PK_S}(<C_x, C_{IDx}>, CID_l), T_4\}$, checks the freshness of $T_4$, decrypts it using its private key sk_s to obtain $\{<C_x, C_{IDx}>, CID_l\}$. Based on $CID_l$, PS verifies the message source again, then retrieves the plaintext scanned face and its identity $<\vec{x_l}, ID_i>$. Since PS maintains a national database of citizen facial templates, it calculates the thief's identity:

$$\langle \vec{v_K}, ID_K \rangle = \text{Min}\left(\sum_{k=1}^{AN} (\vec{x_l} - \vec{v_k})^2\right)$$

In conclusion, PS tracks the stolen vehicle based on the unique chassis number $ID_i$ and takes measures based on the thief's facial identity $<\vec{v_K}, ID_K>$ to complete thief identification.

Integrated with homomorphic encryption, garbled circuits, mutual authentication, and key negotiation, the vehicle theft recognition system proposed in this embodiment exhibits high security and privacy protection capabilities. Firstly, homomorphic encryption ensures data privacy by maintaining sensitive information in encrypted form during transmission and processing. Secondly, garbled circuits enhance system complexity and defense strength, making it difficult for attackers to decipher the system through analytical processes. Finally, mutual authentication guarantees the legitimacy and authenticity of communication parties, thereby preventing various forms of attacks. Within vehicles, onboard units (OBU), roadside units (RSU), cloud servers, and auxiliary servers deploy physically unclonable functions (PUF) to resist physical device side-channel attacks, capture attacks, and collusion attacks on servers. By organically integrating these advanced technologies, this implementation addresses current challenges faced by vehicle anti-theft systems while ensuring vehicle owner privacy, providing a secure and reliable solution. This not only significantly reduces the risk of vehicle theft but also introduces new technological avenues for vehicle management and safety, offering broad application prospects and significant societal value.

The above description represents a preferred embodiment of this application, but the scope of protection of this application is not limited thereto. Any modifications or substitutions readily conceivable by those skilled in the art within the disclosed technological scope of this application should be encompassed within the scope of protection of this application as defined by the claims.

What is claimed is:

1. A method for vehicle-theft driver's identification with privacy protection, comprising the following steps:

periodically acquiring facial data of a current driver in a vehicle;

inputting the facial data into a facial feature extraction model for feature extraction to obtain a facial feature vector of the current driver, wherein the facial feature extraction model is integrated into a control system of the vehicle and is constructed based on a neural network;

comparing the facial feature vector with feature vectors recorded in a preset whitelist to determine whether the facial feature vector is authorized information;

in response to determining that the facial feature vector is the authorized information, determining that the current driver is successfully authenticated;

in response to determining that the facial feature vector is not the authorized information, transmitting the facial feature vector data to Internet of vehicles for detection and recognition to obtain a recognition result; and in response to determining that the recognition result is abnormal, generating alarm information and uploading the alarm information to a trusted authority center within the Internet of vehicles for tracking and positioning;

wherein the Internet of vehicles comprises the trusted authority center and an auxiliary server, and a cloud server, a roadside unit, and the vehicle registered in the trusted authority center, the trusted authority center is a legitimate system for managing national citizen identity information, and physically unclonable functions are respectively deployed in the auxiliary server, the cloud server, the roadside unit, and the vehicle to resist side-channel attacks and capture attacks, thereby ensuring data security; and wherein the method for vehicle-theft driver's identification with privacy protection further comprises:

registering the auxiliary server with the trusted authority center, comprising:

sending, by the auxiliary server, a first registration request to the trusted authority center;

in response to having received the first registration request, generating, by the trusted authority center, a first homomorphic encryption key pair and a first standard encryption key pair for the auxiliary server, and sending, by the trusted authority center, the first homomorphic encryption key pair and the first standard encryption key pair to the auxiliary server;

calculating, by the auxiliary server, first response values of the first homomorphic encryption key pair and the first standard encryption key using the physically unclonable function deployed in the auxiliary server; and calculating, by the auxiliary server and based on the first response values, protection parameters of keys of the auxiliary server, and storing and backing up, by the auxiliary server, the calculated protection parameters of the keys of the auxiliary server, thereby completing registration of the auxiliary server with the trusted authority center.

2. The method for vehicle-theft driver's identification with privacy protection according to claim 1, wherein the comparing the facial feature vector with feature vectors recorded in a preset whitelist to determine whether the facial feature vector is authorized information comprises:

calculating an Euclidean distance value between the facial feature vector and the feature vectors recorded in the preset whitelist based on an Euclidean distance formula, and determining whether the facial feature vector is the authorized information based on the calculated Euclidean distance value.

3. The method for vehicle-theft driver's identification with privacy protection according to claim 1 wherein the method for vehicle-theft driver's identification with privacy protection further comprises:

registering the cloud server with the trusted authority center, comprising:

sending, by the cloud server, a second registration request to the trusted authority center;

in response to having received the second registration request, generating, by the trusted authority center, a second standard encryption key pair for the cloud server, and sending the second standard encryption key pair to the cloud server;

protecting and storing, by the cloud server, the second standard encryption key pair using the physically unclonable function deployed in the cloud server;

selecting, by the cloud server, citizen identity information according to a designated area, and encrypting, by the trusted authority center, the selected citizen identity information using the first homomorphic encryption key pair corresponding to the auxiliary server to obtain encrypted citizen identity information; and transmitting, by the trusted authority center, the encrypted citizen identity information to the cloud server for storage and backup, thereby completing registration of the cloud server with the trusted authority center.

4. The method for vehicle-theft driver's identification with privacy protection according to claim 1, wherein the method for vehicle-theft driver's identification with privacy protection further comprises:

registering the roadside unit with the trusted authority center, comprising:

sending, by the roadside unit, a third registration request to the trusted authority center;

in response to having received the third registration request, generating, by the trusted authority center, registration data for the roadside unit, and sending the registration data to the roadside unit through a secure channel, wherein the registration data includes unique identity data and a private key for the roadside unit;

in response to having received the registration data, performing, by the roadside unit, an availability verification and in response to determining that the availability verification is successful, using, by the roadside unit, the physically unclonable function deployed in the road-side unit to protect and store the registration data and secret parameters, thereby completing registration the roadside unit with the trusted authority center.

5. The method for vehicle-theft driver's identification with privacy protection according to claim 1 wherein the method for vehicle-theft driver's identification with privacy protection further comprises:

registering the vehicle with the trusted authority center, comprising:

sending chassis number data of the vehicle to the trusted authority center for registration to obtain registration parameters;

verifying, by the vehicle, the registration parameters;

in response to the registration parameters are success-fully verified generating, by the vehicle, a key of the vehicle, and constructing, by the vehicle, the preset whitelist based on citizen identity information;

storing and backing up, by the vehicle, the key and the preset whitelist, thereby completing registration of the vehicle with the trusted authority center.

6. The method for vehicle-theft driver's identification with privacy protection according to claim 1 wherein the transmitting the facial feature vector data to the Internet of vehicles for detection and recognition to obtain a recognition result comprises: implementing mutual authentication and key negotiation between the vehicle and the roadside unit to obtain a session key; encrypting the facial feature vector data with the first homomorphic encryption key pair corre-sponding to the auxiliary server; using the session key to encrypt homomorphic ciphertext data of the facial feature vector to obtain encrypted homomorphic ciphertext data; transmitting the encrypted homomorphic ciphertext data to the cloud server; and utilizing, by the cloud server, a homomorphic encryption technology and garbled circuit techniques to perform computations and comparisons on the encrypted homomorphic ciphertext data, thereby obtaining the recognition result.

7. A method for vehicle-theft driver's identification with privacy protection, comprising the following steps:

periodically acquiring, by a vehicle, facial data of a current driver in the vehicle;

inputting, by the vehicle, the facial data into a facial feature extraction model for feature extraction to obtain a facial feature vector of the current driver;

comparing, by the vehicle, the facial feature vector with feature vectors recorded in a preset whitelist within the vehicle to determine whether the facial feature vector is authorized information;

in response to determining that the facial feature vector is the authorized information, determining, by the vehicle, that the current driver is successfully authen-ticated;

in response to determining that the facial feature vector is not the authorized information, transmitting, by the vehicle, the facial feature vector data to Internet of vehicles for detection and recognition to obtain a recognition result, wherein the Internet of vehicles comprises a trusted authority center, and an auxiliary server, a cloud server, a roadside unit, and the vehicle registered in the trusted authority center; and in response to determining that the recognition result is abnormal, generating, by the vehicle, alarm informa-tion and uploading the alarm information to the trusted authority center within the Internet of vehicles for tracking and positioning;

wherein the transmitting, by the vehicle, the facial feature vector data to the Internet of vehicles for detection and recognition to obtain a recognition result comprises:

implementing mutual authentication and key negotia-tion between the vehicle and the roadside unit to obtain a session key;

encrypting the facial feature vector data with a homo-morphic encryption key pair corresponding to the auxiliary server;

using the session key to encrypt homomorphic cipher-text data of the facial feature vector to obtain encrypted homomorphic ciphertext data;

transmitting the encrypted homomorphic ciphertext data to the cloud server; and utilizing, by the cloud server, a homomorphic encryp-tion technology and garbled circuit techniques to perform computations and comparisons on the encrypted homomorphic ciphertext data, thereby obtaining the recognition result.

8. A method for vehicle-theft driver's identification with privacy protection, comprising the following steps:

periodically acquiring facial data of a current driver in a vehicle;

inputting the facial data into a facial feature extraction model for feature extraction to obtain a facial feature vector of the current driver;

comparing the facial feature vector with feature vectors recorded in a preset whitelist within the vehicle to determine whether the facial feature vector is autho-rized information;

in response to determining that the facial feature vector is the authorized information, determining that the current driver is successfully authenticated;

in response to determining that the facial feature vector is not the authorized information, transmitting the facial feature vector data to Internet of vehicles for detection and recognition to obtain a recognition result, wherein the Internet of vehicles comprises: a trusted authority center, an auxiliary server, a cloud server, and the vehicle, and the auxiliary server, the cloud server and the vehicle registered in the trusted authority center; and in response to determining that the recognition result is abnormal, generating alarm information and uploading the alarm information to the trusted authority center within the Internet of vehicles for tracking and posi-tioning;

wherein the method for vehicle-theft driver's identifica-tion with privacy protection further comprises:

registering the cloud server with the trusted authority center, comprising:

sending, by the cloud server, a registration request to the trusted authority center;

in response to having received the registration request, generating, by the trusted authority cen-ter, a standard encryption key pair for the cloud server, and sending the standard encryption key pair to the cloud server;

protecting and storing, by the cloud server, the standard encryption key pair using a physically unclonable function deployed in the cloud server;

selecting, by the cloud server, citizen identity infor-mation according to a designated area, and encrypting, by the trusted authority center, the selected citizen identity information using a homomorphic encryption key pair corresponding to the auxiliary server to obtain encrypted citizen identity information; and transmitting, by the trusted authority center, the encrypted citizen identity information to the cloud server for storage and backup, thereby completing registration of the cloud server with the trusted authority center.

\* \* \* \* \*